United States Patent
Clamors et al.

(10) Patent No.: US 6,834,870 B1
(45) Date of Patent: Dec. 28, 2004

(54) METHOD AND APPARATUS FOR HANDLING FLUORESCENT LIGHT BULBS

(76) Inventors: Michael T. Clamors, 7120 Comell Ave., University City, MO (US) 63130; Mark S. Zykan, 3451 St. Donald St., St. Ann, MO (US) 63074

( * ) Notice: Subject to any disclaimer, the term of this patent is extended or adjusted under 35 U.S.C. 154(b) by 35 days.

(21) Appl. No.: 10/205,452

(22) Filed: Jul. 25, 2002

(51) Int. Cl.[7] .................................................. B60B 3/10
(52) U.S. Cl. ..................... 280/47.34; 280/35; 280/79.3
(58) Field of Search ................................ 280/35, 47.34, 280/47.35, 47.39, 79.3, 79.6, 79.7

(56) References Cited

U.S. PATENT DOCUMENTS

| | | | | |
|---|---|---|---|---|
| 707,950 A | * | 8/1902 | Steer | 280/47.34 |
| 1,308,934 A | * | 7/1919 | Chesnutt | 254/3 B |
| 1,358,235 A | * | 11/1920 | Nylin | 280/47.34 |
| 2,118,711 A | * | 5/1938 | McKinney | 254/3 C |
| 2,133,126 A | * | 10/1938 | Walton, Jr. | 298/2 |
| 2,733,930 A | * | 2/1956 | Putterman | 280/641 |
| 3,187,886 A | * | 6/1965 | Honey | 406/189 |
| 3,540,753 A | * | 11/1970 | Hanson | 280/47.34 |
| 3,693,996 A | * | 9/1972 | Hardy | 280/47.34 |
| 3,897,080 A | * | 7/1975 | Isom | 280/47.19 |
| 4,536,033 A | * | 8/1985 | Allen | 298/2 |
| 5,515,971 A | * | 5/1996 | Segrest | 206/418 |
| 6,109,628 A | * | 8/2000 | Scheper | 280/47.35 |
| 6,168,174 B1 | * | 1/2001 | MacDougall | 280/47.34 |
| 6,217,045 B1 | * | 4/2001 | Leyton | 280/79.7 |

* cited by examiner

*Primary Examiner*—Christopher P. Ellis
*Assistant Examiner*—Christopher Bottorff
(74) *Attorney, Agent, or Firm*—Harness Dickey & Pierce, P.L.C.

(57) ABSTRACT

A cart for supporting a container in an appropriate orientation for holding fluorescent light bulbs includes a support at an angle of between about 30° and about 60°. A method of handling fluorescent bulbs includes supporting an elongate, open ended container for the fluorescent bulbs on a wheeled cart at an angle of between about 30° and about 60° to permit efficient loading and unloading of the bulbs in the open container, and retaining the container in that orientation until the container is fully loaded.

6 Claims, 5 Drawing Sheets

METHOD AND APPARATUS FOR HANDLING FLUORESCENT LIGHT BULBS

FIELD OF THE INVENTION

This invention relates to the handling of fluorescent bulbs, and in particular to methods and apparatus for holding and transporting fluorescent bulbs.

Fluorescent bulbs are widely used in commercial and residential settings. A fluorescent bulb is a glass tube with electrodes on the end. Fluorescent bulbs contain a small quantity of mercury that can be harmful to the environment and to human health when improperly managed. Mercury is regulated under RCRA, which is administered by the US Environmental Protection Agency. Under current Federal law, mercury-containing lamps such as fluorescent may be hazardous waste. To prevent toxic material from contaminating the environment, fluorescent bulbs must be disposed of responsibly.

While fluorescent bulbs can come in a variety of sizes and shapes, the majority of bulbs are either 1⅜ inches in diameter and either 48 inches, 72 inches, or 96 inches long. Because they are fragile and because of their size, fluorescent bulbs can be hard to handle. A broken bulb presents hazards not just from injury from the broken glass, but also from contamination from the mercury vapor in the bulb. It is convenient to collect and hold fluorescent bulbs in an elongate container to protect the bulbs from breakage and contain the contents if there is a breakage. However, it is difficult to fully load a container that is upright or on its side, the bulbs tend to move within the box, breaking and/or making it difficult to load additional bulbs into the container.

SUMMARY OF THE INVENTION

The present invention relates to a method of, and apparatus for, handling fluorescent bulbs, to facilitate the fast and efficient collection and disposal, while minimizing the risk of breakage, and the attendant risks of injury and contamination.

Generally, the method of this invention comprises supporting a container for the fluorescent bulbs at an angle while it is being filled. This allows the bulbs to be arranged in the most efficiently packed arrangement, and reduces the incidence of the bulbs moving before the container is filled. In the preferred embodiment, the container is held at an angle of between about 30° and about 60°, and more preferably at an angle of between about 35° and about 50°, and most preferably at an angle of between about 400 and about 45°.

Generally, the apparatus of this invention comprises a cart having a support having a sloped support surface for supporting a container for collecting fluorescent bulbs at an angle, and maintaining the container at that angle while the container is moved about as it is filled. The cart preferably holds the container at an angle of between about 30° and about 60°, and more preferably at an angle of between about 35° and about 50°, and most preferably at an angle of between about 40° and about 45°.

In the preferred embodiment, the cart comprises a base having a first and second ends, a first pair of wheels on the first end of the base, a second pair of wheels at the second end of the base. A strut, having first and second ends, is hingedly mounted at its first end to the first end of the base. A support having first and second ends, hingedly mounted at its first end to the second end of the base. The hinged mounting of the strut and support permit the strut and the support to swing between a folded position, in which the strut and the support lie generally parallel to the base, and an extended position in which the second end of the strut engages the support to hold the support at an angle of between about 30° and about 60° with respect to the base, more preferably at an angle of between about 350 and about 50°, and most preferably at an angle of between about 40° and about 45°. The support surface is preferably curved to support a cylindrical collection container.

Thus the method and apparatus of the present invention provide a fast and inexpensive way to collect fluorescent bulbs by holding the collection container in a preferred orientation while that container is being filled. This makes it easier to more densely pack the container, and reduces the risk that bulbs will be broken while the container is moved about as it is being filled, and as bulbs are inserted into the container. %

BRIEF DESCRIPTION OF THE DRAWINGS

Corresponding reference numerals indicate corresponding parts throughout the several view of the drawings.

DESCRIPTION OF THE PREFERRED EMBODIMENT

Figure 1:
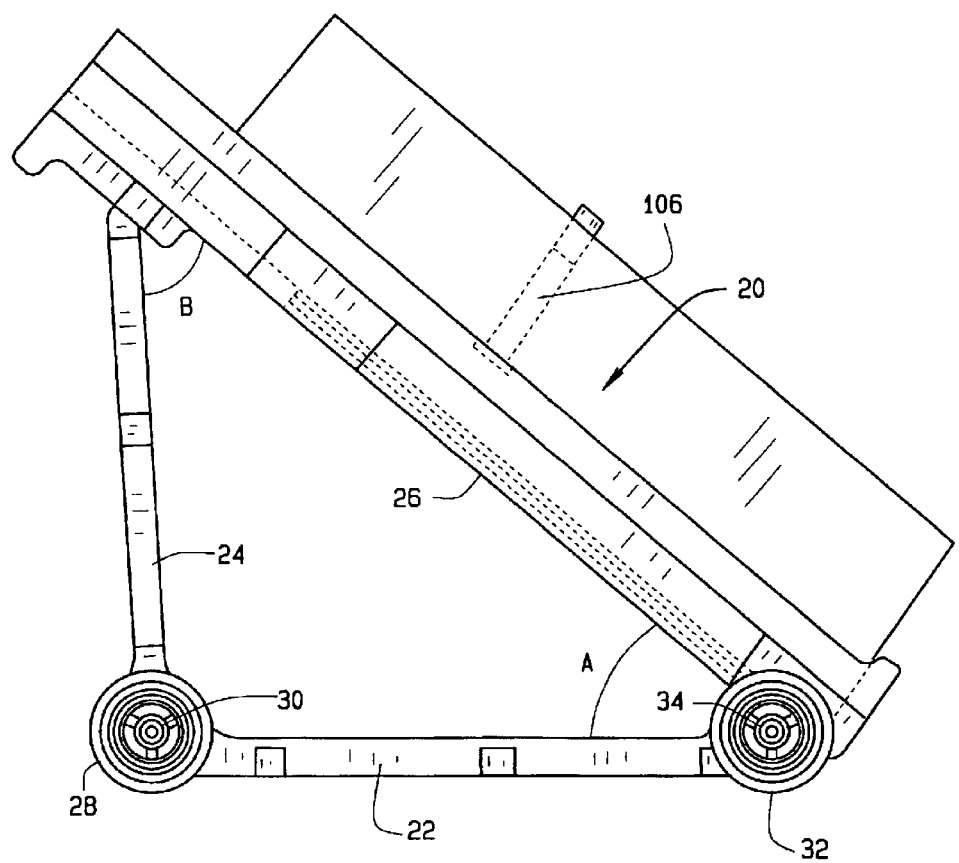
FIG. 1 is a side elevation view of a cart constructed according to the principles of this invention in its extended position.
Figure 2:
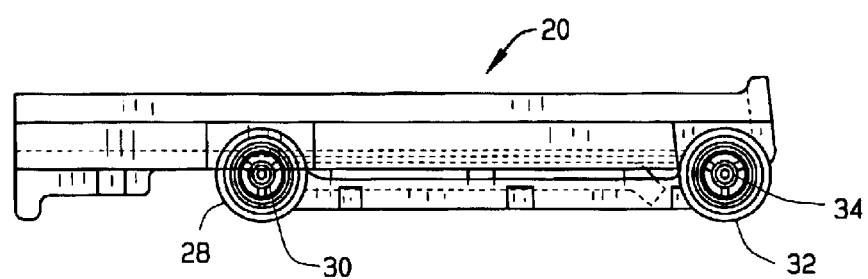
FIG. 2 is a side elevation view of a cart constructed according to the principles of this invention in its collapsed position.
Figure 3:
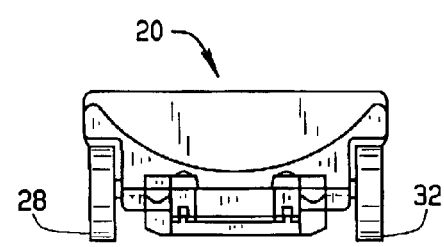
FIG. 3 is a left end elevation view of the cart as shown in FIG. 2.
Figure 4:
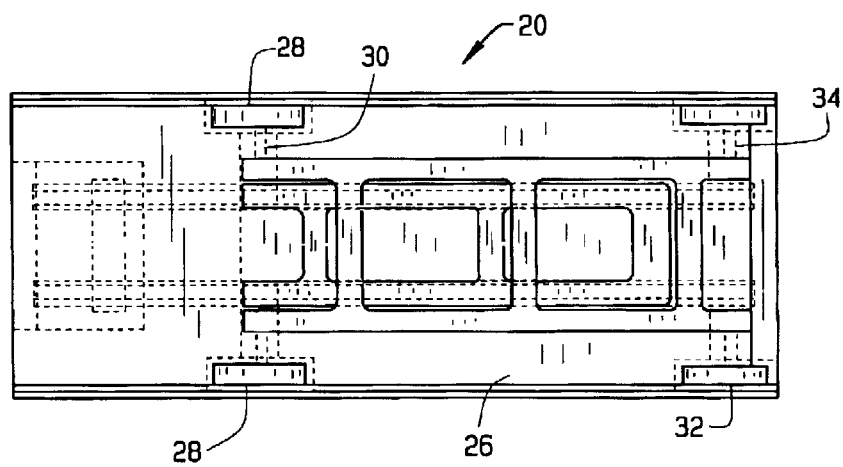
FIG. 4 is bottom plan view of the cart as shown in FIG. 2.

A cart constructed in accordance with the principles of this invention, and useful in the methods of this invention is indicated generally as 20 in FIGS. 1–4. The cart 20 comprises a base 22, a strut 24, and a support 26, and as first pair of wheels 28 on axle 30 at one end of the base, and a second pair of wheels 32 on axle 34 at the other end of the base. In the preferred embodiment, the strut 24 and the support 26 are hingedly connected to the base 22 so that they can be pivoted relative to the base between an extended position (shown in FIG. 1) and a collapsed position (shown in FIGS. 2–4).

Figure 5:
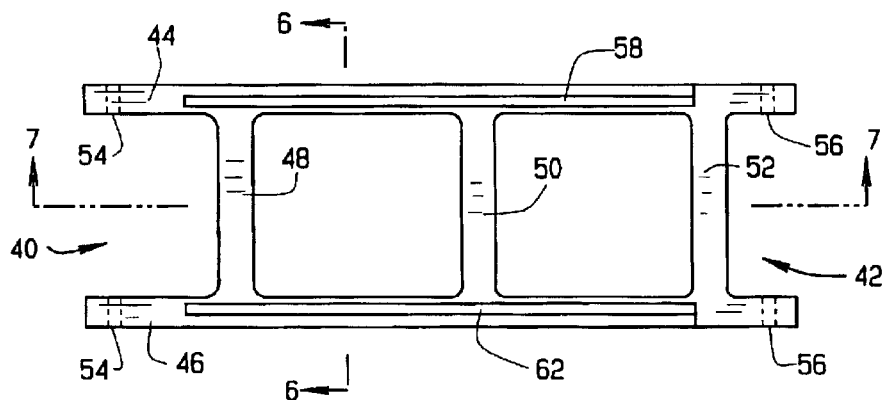
FIG. 5 is bottom plan view of the base of the cart.
Figure 6:
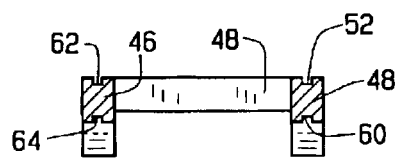
FIG. 6 is a transverse cross-sectional view taken along the plane of line 6—6 in FIG. 5.
Figure 7:
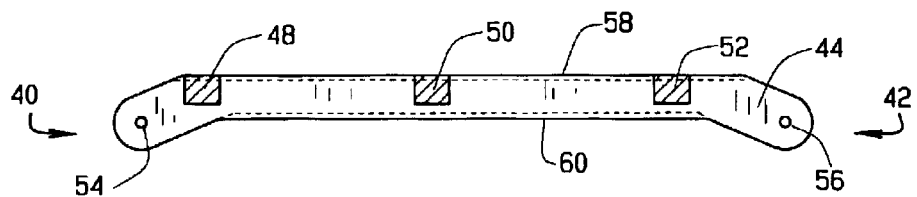
FIG. 7 is a longitudinal cross-sectional view taken along the plane of line 7—7 in FIG. 5.

As shown in FIGS. 5–7, the base 22 has a first end 40 and a second end 42. The base 22 comprises first and second longitudinally extending rails 44 and 46. Three transverse members 48, 50, and 52 extend between the first and second rails 44 and 46. The ends of the rails 44 and 46 adjacent the first end 40 of the base ends slope generally upwardly, and have aligned holes 54 therethrough. Similarly, the ends of the rails 44 and 46 adjacent the second end 42 of the base slope generally upwardly, and have aligned holed 56 therein. There are grooves 58 and 60 formed in the bottom and top of the rail 44, and groves 62 and 64 formed in the bottom and top of the rail 46. The base 22 can be made of molded plastic, for example a polyethylene plastic, so that it is tough, durable, and strong, yet light weight.

Figure 8:
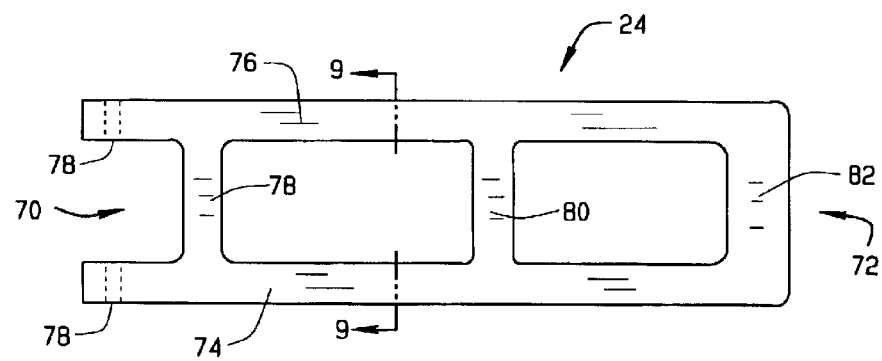
FIG. 8 is a top plan view of the strut of the cart.
Figure 9:
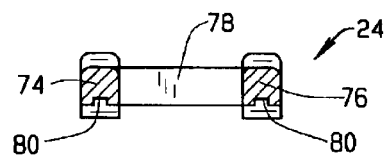
FIG. 9 is a transverse cross-sectional view of the strut, taken along the plane of line 9—9 in FIG. 8.
Figure 10:
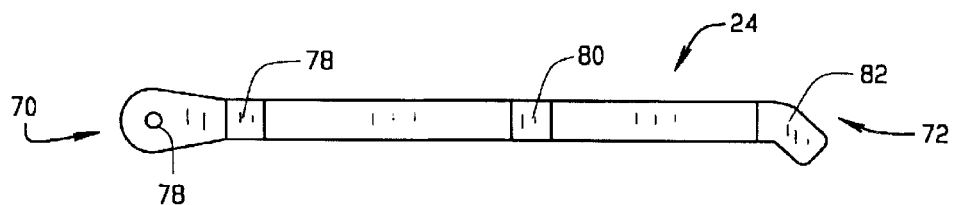
FIG. 10 is a longitudinal cross-sectional view of the strut, taken along the plane of line 10—10 in FIG. 8.

As shown in FIGS. 8–10, the strut 24 has a first end 70 and a second end 72. The strut 24 comprises first and second longitudinally extending rails 74 and 76. Three transverse members 78, 80 and 82 extend between the first and second rails 74 and 76. The ends of rails 74 and 76 adjacent the first end 70 have aligned holes 78. The ends of the rails 74 and 76 adjacent the second end 72 bend out of the plane of the strut 70. There is a groove 80 on the underside of the rail 74, and a groove 82 on the underside of the rail 76. The strut 24 can be made of molded plastic, for example a polyethylene plastic, so that it is tough, durable, and strong, yet light weight.

Figure 11:
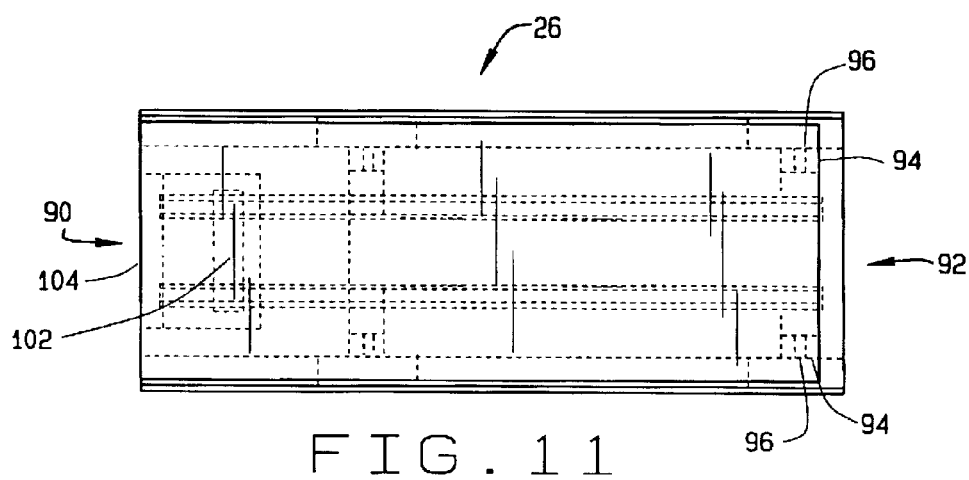
FIG. 11 is a top plan view of the support of the cart.
Figure 12:
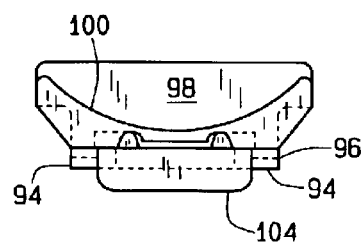
FIG. 12 is a end left elevation view of the support shown in FIG. 1.
Figure 13:
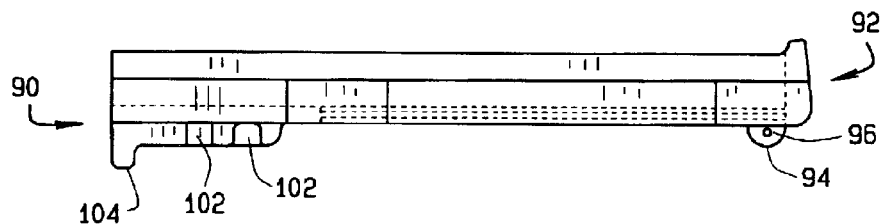
FIG. 13 is a side elevation view of the support.

As shown in FIGS. 11–13, the support 26 has a first end 90 and a second end 92. The support 26 has a tabs 94 projecting from the bottorn, adjacent the second end 92. There are aligned holes 96 through the tabs 94. The support 90 includes a support surface for supporting a container of fluorescent bulbs. In the preferred embodiment the support surface includes a generally planar surface 98 for engaging the bottom of the container, and a curved surface 100 for engaging the sidewall of the container. The support has a recess 102 on its underside for receiving the second end 72 of the strut, so that the strut holds the support at an angle of between about 30' and about 60°, and more preferably at an angle of between about 35° and about 50°, and still more preferably at an angle of between about 40' and about 45'. This is indicated as angle A in FIG. 1. In the preferred embodiment, there are at least two recesses 102 so that the angle A can be adjusted by moving the second end 72 from one recess 102 to another. There is a handgrip 104 formed on the underside of the support 26. The support 26 can be made of molded plastic, for example a polyethylene plastic, so that it is tough, durable, and strong, yet light weight. A belt 106 can be provided with a buckle, or more preferably a closure of mating hook and loop type fastening material, so secure a container on the support.

Referring to FIGS. 1 through 4, ends of the rails 74 and 76 at the first end of the strut 24 fit within the ends of the rails 44 and 46 at the first end of the base 22. The axle 30 extends through the aligned holes 78 in the strut and 54 in the base, hingedly mounting the first end 70 of the strut 24 to the first end 40 of the base 22. As described above, the wheels 28 are mounted on the ends of the axle 104. Similarly, the tabs 94 on the support 26 fit between the rails 44 and 46 at the second of the base. The axle 34 extends through holes 56 in the ends of the rails 46 and 46 at the second end of base 22 and through holes 96 in tabs 94 on the support 26, hingedly mounted the second end of the support and the second end of the base. As described above, wheels 32 are mounted on the ends of the axle 106.

Thus, the cart 20 can be folded into its collapsed state by disengaging the strut and the support, folding the strut flush against the base, and then folding the support over the base and strut. However, the cart can be quickly assembled into its operating state by unfolding the support, unfolding the strut and engaging the second end of the strut in the recess 102 in the underside of the support. The support 26 holds a container, such a drum at an appropriate angle for loading the container with fluorescent bulbs, and maintaining the container in this orientation as its is moved from place to place until the container is filled

What is claimed is:

1. A cart for supporting an open-ended container in an appropriate orientation to load fluorescent bulbs into the container, the cart comprising:

a base having first and second ends, a first axle at the first end, a first pair of wheels on first axle at the first end of the base, a second axle at the second end, a second pair of wheels on the second axle at the second end of the base;

a strut, having first and second ends, hingedly mounted at its first end to the first axle at the first end of the base;

a support having first and second ends, hingedly mounted at its first end to the second axle at the second end of the base, and a front face configured to engage the container, and a back face having a recess therein adjacent the second end;

the hinged mounting of the strut and support permitting the strut and the support to swing between a folded position, in which the strut and the support lie generally parallel to the base, and an extended position in which the strut extends generally perpendicularly from the base with the second end of the strut engaged in the recess in the support to hold the support at an angle of between about 30° and about 60° with respect to the base.

2. The cart according to claim 1 wherein the support is held at an angle of between about 35° and about 50° with respect to the base when the support is in the extended position.

3. The cart according to claim 1 wherein the front face of the support has a curved surface adapted for engaging a curved container.

4. The cart according to claim 3 wherein the support is held at an angle of between about 35° and about 50° with respect to the base when the support is in the extended position.

5. In combination with a generally cylindrical container having an open end for receiving a plurality of fluorescent lamps, a cart comprising a support for supporting the container at an angle of between about 30° and about 60° with respect to vertical, the cart comprising a base having first and second ends, a first pair of wheels on the first end of the base, a second pair of wheels at the second end of the base;

a strut, having first and second ends, hingedly mounted at its firs end to the first end of the base;

a support having first and second ends, hingedly mounted at its first end to the second end of the base, the support having a curved configuration to engage a portion of the generally cylindrical container;

a first axle adjacent the first end of the base, a second axle adjacent the second end of the base, and wherein the first end of the strut is pivotally mounted on the first axle and the first end of the support is pivotally mounted on the second axle; and the hinged mounting of the strut and support, permitting the strut and the support to swing between a folded position, in which the strut and the support lie generally parallel to the base, and an extended position in which the second end of the strut engages the support at an angle of between about 30° and about 60° with respect to the base.

6. The combination according to claim 5 wherein the support has a rear face opposite the front face, having a recess therein, and wherein when the strut and support are in the extended position, the strut extends generally vertically, with the second of the strut in the recess in the back face of the support.

* * * * *